US012104464B2

(12) United States Patent
Dennis et al.

(10) Patent No.: US 12,104,464 B2
(45) **Date of Patent: *Oct. 1, 2024**

(54) CLEANOUT TOOLS AND RELATED METHODS OF OPERATION

(71) Applicant: Michael W. Dennis, Kermit, TX (US)

(72) Inventors: Michael W. Dennis, Kermit, TX (US); Gary W. Pankonien, Georgetown, TX (US); Garry A. Wilson, Hobbs, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/144,243

(22) Filed: May 7, 2023

(65) Prior Publication Data

US 2023/0272695 A1 Aug. 31, 2023

Related U.S. Application Data

(63) Continuation of application No. 17/586,826, filed on Jan. 28, 2022, now Pat. No. 11,686,178, which is a (Continued)

(51) Int. Cl.
*E21B 37/00* (2006.01)
*B05B 3/06* (2006.01)

(Continued)

(52) U.S. Cl.
CPC ............ *E21B 37/00* (2013.01); *B08B 9/0433* (2013.01); *E21B 37/06* (2013.01); *B05B 3/06* (2013.01);

(Continued)

(58) Field of Classification Search
CPC .... E21B 37/00; E21B 41/0078; Y10S 239/05; B05B 3/0404
See application file for complete search history.

(56) References Cited

U.S. PATENT DOCUMENTS 2,086,515 A * 7/1937 Evans ...................... B05B 17/04 239/246
3,004,719 A * 10/1961 Pouppirt, Jr. ......... B05B 3/0404 239/DIG. 19

(Continued)

FOREIGN PATENT DOCUMENTS

WO 2016205956 A1 12/2016

OTHER PUBLICATIONS

Raio-Jet Jetting Tool, Remove hard-scale deposits with single-pass cleaning from surface to total depth, Product Overview, https://assets.www .bakerhughes.com/system/0b/d284c0182511e491027bccea6fb9cf/31597-Roto-Jet-Jettng-Tool-OV.pdf, Accessed May 30, 2017, 2 pages, Copyright 2014 Baker Hughes Incorporated.

(Continued)

*Primary Examiner* — Robert E Fuller

(74) *Attorney, Agent, or Firm* — Dickinson Wright PLLC; Mark E. Scott

(57) ABSTRACT

Cleanout tools and related methods of operation. At least some of the example embodiments are cleanout tools including a tool body that defines an internal annular channel, a joiner coupled to the tool body, a sleeve telescoped within the joiner and tool body, and a ball disposed within the annular channel. The ball held within the annular channel by the sleeve, and the ball configured to move along the annular channel under force of fluid pumped into the cleanout tool. The ball creates a pulsing of fluid streams exiting the tool body. Moreover, in some example systems the fluid streams created by the tool body intersect the inside diameter of a casing at non-perpendicular angles.

16 Claims, 13 Drawing Sheets

Related U.S. Application Data continuation of application No. 16/657,047, filed on Oct. 18, 2019, now Pat. No. 11,255,159, which is a continuation of application No. 16/173,238, filed on Oct. 29, 2018, now Pat. No. 10,465,480.

(60) Provisional application No. 62/595,120, filed on Dec. 6, 2017.

(51) Int. Cl.
*B05B 15/658* (2018.01)
*B08B 9/043* (2006.01)
*E21B 37/06* (2006.01)
*E21B 41/00* (2006.01)

(52) U.S. Cl.
CPC ......... *B05B 15/658* (2018.02); *E21B 41/0078* (2013.01)

(56) References Cited

U.S. PATENT DOCUMENTS

| | | | | |
|---|---|---|---|---|
| 3,974,886 | A * | 8/1976 | Blake, Jr. | E21B 7/06 175/269 |
| 4,089,471 | A * | 5/1978 | Koenig | B05B 3/0404 239/447 |
| 4,164,325 | A | 8/1979 | Watson | |
| 4,967,841 | A | 11/1990 | Murray | |
| 5,195,585 | A | 3/1993 | Clemens et al. | |
| 5,337,819 | A | 8/1994 | Tailby | |
| 5,505,262 | A | 4/1996 | Cobb | |
| 5,685,487 | A | 11/1997 | Ellis | |
| 5,832,655 | A | 11/1998 | Crumrine et al. | |
| 6,029,746 | A | 2/2000 | Dodd | |
| 6,062,311 | A | 5/2000 | Johnson et al. | |
| 6,397,864 | B1 | 6/2002 | Johnson | |
| 7,686,102 | B2 | 3/2010 | Swinford | |
| 7,874,366 | B2 | 1/2011 | Allcorn et al. | |
| 8,298,349 | B2 | 10/2012 | Wojciechowski, III et al. | |
| 9,366,113 | B2 | 6/2016 | Etschel et al. | |
| 10,465,480 | B2 * | 11/2019 | Dennis | E21B 37/06 |
| 11,686,178 | B2 * | 6/2023 | Dennis | B08B 9/0433 166/311 |
| 2007/0017679 | A1 | 1/2007 | Wolf et al. | |
| 2012/0211229 | A1 | 8/2012 | Fielder | |
| 2013/0220618 | A1 | 8/2013 | Pollard et al. | |
| 2014/0014350 | A1 | 1/2014 | Sebree | |
| 2014/0144618 | A1 | 5/2014 | Groves | |
| 2018/0195369 | A1 | 7/2018 | Resendez | |

OTHER PUBLICATIONS

"JetVak Oil Well Cleanout—Quantum Downhole Systems," Product Overview, http://www.quantumdownhole.com/etvak.php, Accessed May 30, 2017, 3 pages, Quantum Downhole Systems Inc. 2010.

International Search Report mailed Jan. 14, 2019 for PCT International Patent Application No. PCT/US2018/057928 filed Oct. 29, 2018; 5 pages.

International Written Opinion mailed Jan. 14, 2019 for PCT International Patent Application No. PCT/US2018/057928 filed Oct. 29, 2018; 6 pages.

* cited by examiner

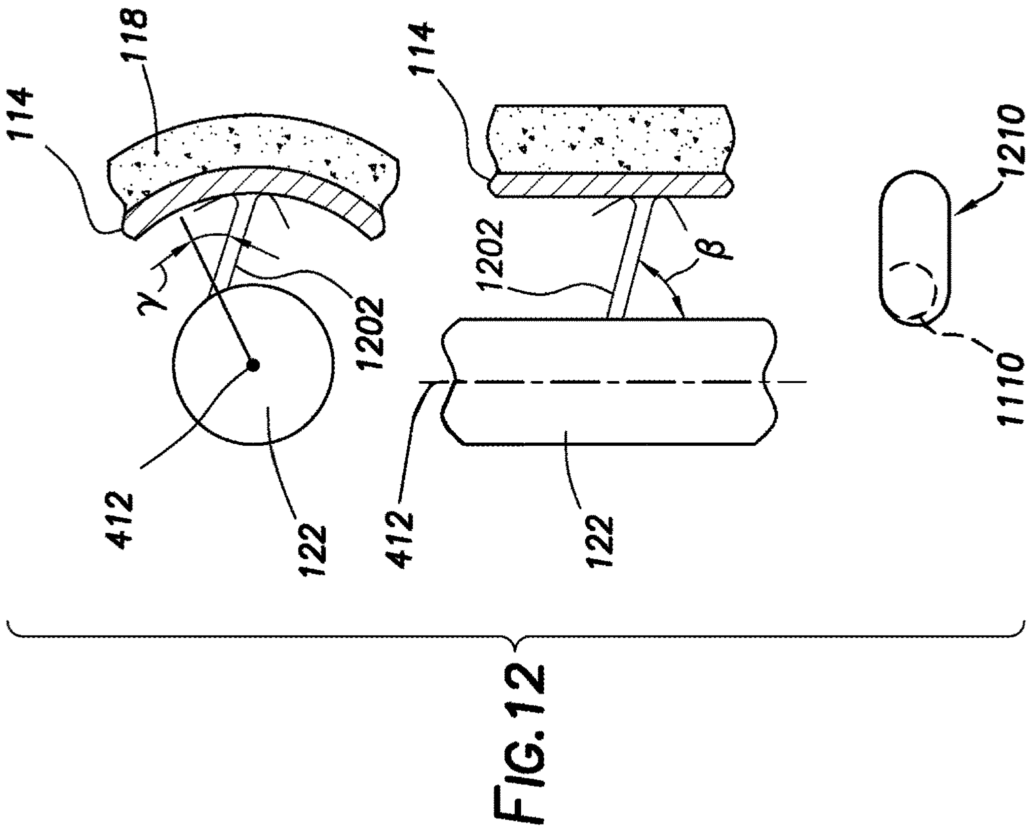
FIG. 12
FIG. 11
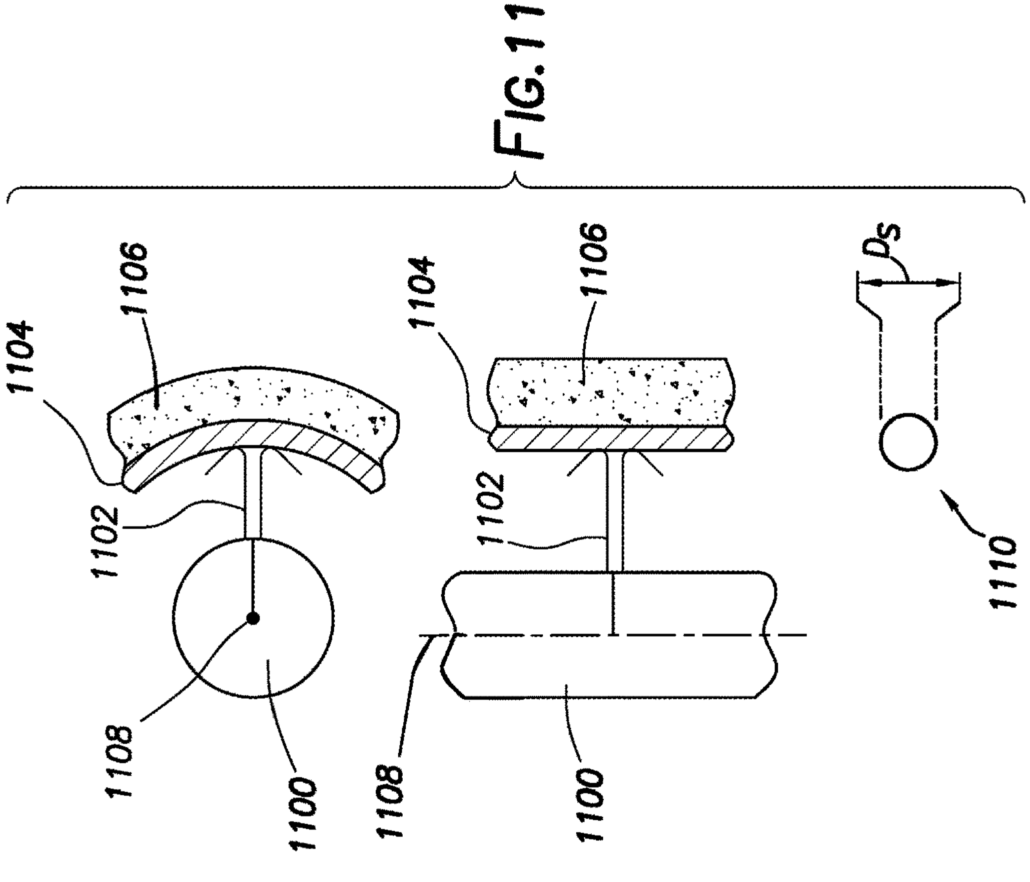

CLEANOUT TOOLS AND RELATED METHODS OF OPERATION

CROSS-REFERENCE TO RELATED APPLICATIONS

This application is a continuation of application Ser. No. 17/586,826 filed Jan. 28, 2022 titled "Cleanout Tools And Related Methods Of Operation". The Ser. No. 17/586,826 application is a continuation of application Ser. No. 16/657,047 filed Oct. 18, 2019 titled "Cleanout Tools And Related Methods Of Operation" (now U.S. Pat. No. 11,255,159). The Ser. No. 16/657,047 application is a continuation of application Ser. No. 16/173,238 filed Oct. 29, 2018 titled "Cleanout Tools And Related Methods Of Operation" (Now U.S. Pat. No. 10,465,480). The Ser. No. 16/173,238 application claims the benefit of U.S. Provisional Patent Application No. 62/595,120 filed Dec. 6, 2017 titled "Cleanout Tools And Related Methods Of Operation." All the above-noted applications are incorporated by reference herein as if reproduced in full below.

BACKGROUND

The production of any kind of wells (e.g., water, oil, natural gas, injection) diminishes over time. Diminishment of production may be caused by depletion of the source reserves from the underground formation. However, diminishment of the production may also be caused by building up of scale, particles, sludge, paraffins, and biofilm in the perforations of the casing that fluidly couple to the reservoir itself. In many cases, the volume of production (e.g., water, oil, natural gas) can be increased by performing a cleanout operation using a cleanout tool. Any cleanout tool system or method that makes the cleanout operation more thorough, faster, or cheaper to perform would provide a competitive advantage in the marketplace.

BRIEF DESCRIPTION OF THE DRAWINGS

For a detailed description of example embodiments, reference will now be made to the accompanying drawings in which:

FIG. 11 shows both a simplified overhead (cross-sectional) view at a particular elevation of a cleanout tool in operation, a simplified side elevation view of a cleanout tool in operation, and example swath size, in accordance with at least some embodiments;

FIG. 12 shows both a simplified overhead view at a particular elevation of a cleanout tool in operation, a simplified side elevation view of a cleanout tool in operation, and example swath size, in accordance with at least some embodiments;

DEFINITIONS

Figure 1:
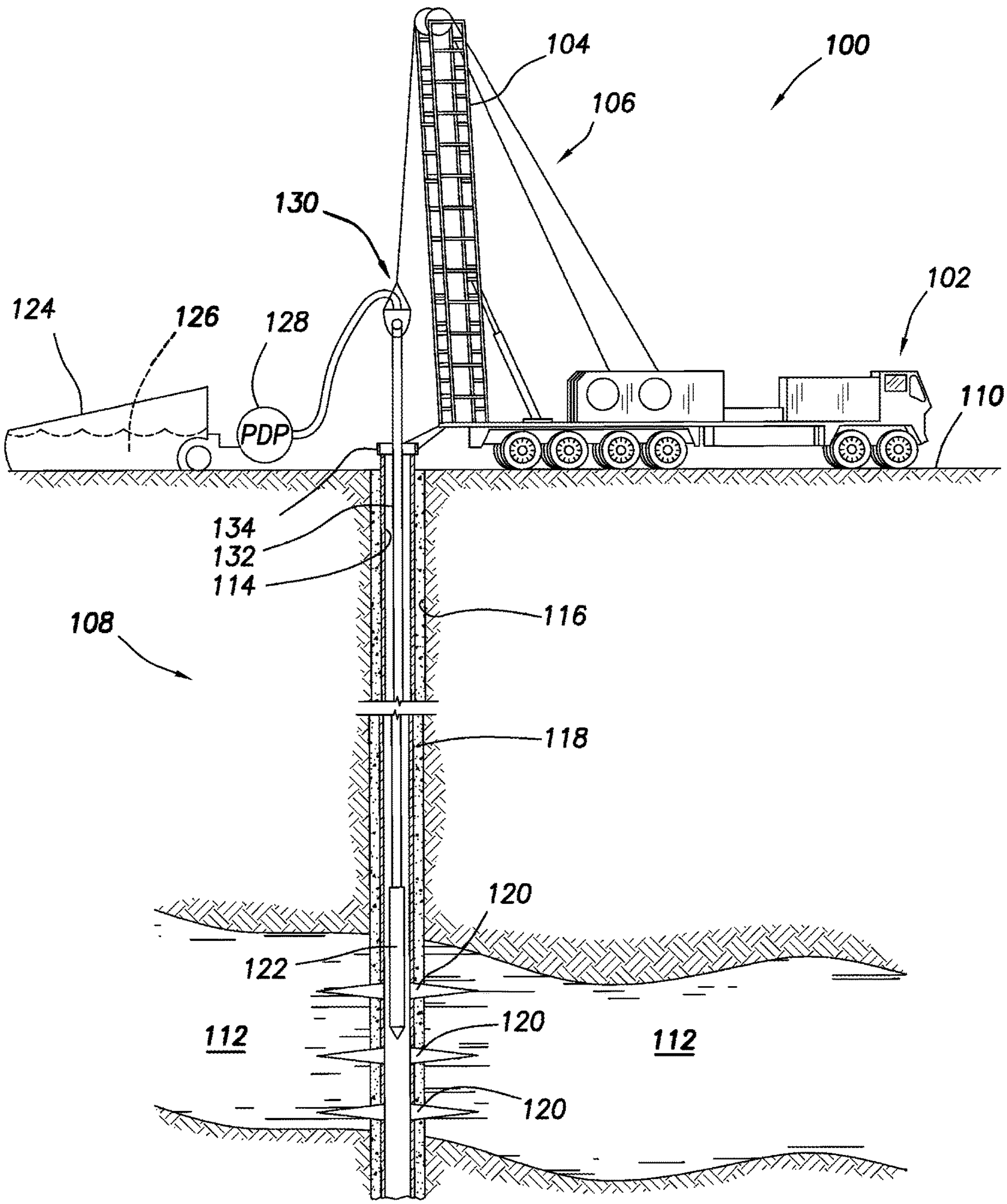
FIG. 1 shows a side elevation, partial cross-sectional, view of a workover operation in accordance with at least some embodiments.

Various terms are used to refer to particular system components. Different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"About" in relation to a recited value shall mean the recited value plus or minus five percent of the recited value.

Reference to a "bore," "through bore," "counter bore," or "blind bore" shall not imply or require any method of creating the bore. For example, a through bore may be created by boring by way of a drill bit, or the through bore may be created by casting the device in a mold that defines the through bore.

"Equal" in reference to size of a feature of two components (e.g., inside diameter) shall mean equal within manufacturing tolerances.

"Above" and "below" in relation to location within a hydrocarbon well shall refer to distance into the hydrocarbon well, and not necessarily depth below the Earth's surface, as some hydrocarbon wells may have portions (e.g., "lateral" portions following shale layers) where increasing distance into the hydrocarbon well results in more shallow depth relative to the Earth's surface.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various embodiments are directed to a cleanout tool and related method of operation. More particularly, various embodiments are directed to a cleanout tool that comprises a tool body, a joiner coupled to the tool body, a ball disposed within an annular channel within the tool body, and a sleeve telescoped within the tool body and joiner (and the sleeve at least partially occluding the annular channel). The cleanout tool comprises a plurality of ports through the tool body, the ports in fluid communication with the annular channel. Fluids pumped into the cleanout tool from the surface enter the annular channel through ducts through the sleeve, and the orientation of the ducts and fluid flow within the annular channel cause the ball to move around the annular channel. Movement of the ball causes the ball to periodically and sequentially block ports, resulting in a pulsating fluid stream exiting the ports. In some cases, the ports are designed and constructed such that the fluid streams exiting the ports intersect an inside diameter of the casing at depths within the casing different than the depths within the casing where the fluid streams exit the ports. For example, the fluid streams from the ports may be directed downward, or the fluid streams from the ports may be directed upward or out the side horizontally. Moreover, in some cases the ports are designed and constructed such that the fluid dynamic aspects of fluid streams exiting the ports provide a rotational force to the cleanout tool, though in some embodiments the cleanout tool is held against rotation. As will be discussed in greater detail below, the non-radial nature of the fluid streams exiting the ports increases swath area or swath size that each fluid stream creates on the inside diameter of the casing, may create a tornadic effect of the fluid outside the tool, and may also increase the effectiveness of scale removal. The specification now turns to an example workover operation to orient the reader.

The various embodiments were created in the context of hydrocarbon well bores, and cleanout operations associated with hydrocarbon well bores. The description that follows is based on the developmental context; however, the developmental context shall not limit the applicability of the tool to just hydrocarbon well bores. Many other types of wells may benefit from use of such tool and methods as described below, such as water wells, natural gas wells, and disposal wells (e.g., wells into which fluids to be disposed are pumped). FIG. 1 shows a side elevation, partial cross-sectional, view of a workover operation in accordance with at least some embodiments. FIG. 1 is not to scale. In particular, the workover operation 100 comprises a workover rig 102 that comprises a derrick 104 having one or more lines 106 used to raise and lower various objects out of and into the hydrocarbon well 108. The example hydrocarbon well 108 extends from the Earth's surface 110 to a hydrocarbon reservoir 112. The hydrocarbon well 108 may include a metallic casing 114 that extends from the surface 110 to and in some cases beyond the hydrocarbon reservoir 112. The casing 114 may be associated with the various surface valves (e.g., valve tree) to control flow into and out of the inside diameter of the casing 114, but the surface valves are not shown so as not to unduly complicate the figure. The casing 114 extends into a borehole 116, and may be held in place by cement 118 in the annulus between an outside diameter of the casing 114 and an inside surface of the borehole 116. In the location of the hydrocarbon reservoir 112, the casing 114 has a plurality of perforations 120, which creates a path for fluid flow from the hydrocarbon reservoir 112 into the inside diameter of the casing 114. While the hydrocarbon well 108 and thus the casing 114 are shown as vertical, the various embodiments and related methods of a cleanout tool may also be used in wells with non-vertical portions (e.g., horizontal lateral sections along shale layers).

In some example workover operations the production tubing (not specifically shown) is removed from within the casing 114. Thereafter, a cleanout tool 122 is lowered into the casing 114 and placed in operational relationship to the perforations 120. Once in place, fluid is pumped into the cleanout tool 122. In the example situation of FIG. 1, a tank 124 is located at the surface 110 in proximity to the hydrocarbon well 108, the tank 124 holding a fluid 126. The fluid 126 may be any suitable fluid, such as fresh water, salt water, an acid solution, or water with additives that chemically react with the scale and other deposits. The tank 124 is fluidly coupled to the suction inlet of a positive displacement pump 128 (labeled "PDP" in the drawings). The outlet of the positive displacement pump is fluidly coupled to a swivel 130, and the swivel fluidly couples to the inside diameter of tubing 132. Tubing 132, in turn, is fluidly coupled to the cleanout tool 122. In some cases the tubing 132 is the production tubing. That is, the tubing 132 in the form of production tubing is pulled from the casing 114. The cleanout tool 122 is coupled to the distal end of the production tubing, and then the production tubing and cleanout tool 122 are lowered back into the casing 114. In other cases, the production tubing may be pulled from the casing by the workover rig 102 and set aside. Then additional tubing (e.g., individual pipe joints, or coiled tubing) may be the tubing 132 used to lower the cleanout tool into the casing 114.

The swivel 130, as the name implies, enables the pump 128 to fluid into the tubing 132 while the tubing and cleanout tool 122 are rotated about the central axis of the casing 114. Relatedly in example cases, the workover rig 102 may include a Kelley and Kelley drive (collectively referred to as a Kelley 134) at the surface to control rotational orientation of the tubing 132 and cleanout tool 122 relative to the casing 114. As will be discussed in more detail below, the Kelley 134 in some cases holds the tubing 132 and cleanout tool 122 against rotation as the cleanout tool 122 traverses the axial distance between the boundaries of the perforations 120. The specification now turns to a description of the cleanout tool in accordance with example embodiments.

Figure 2:
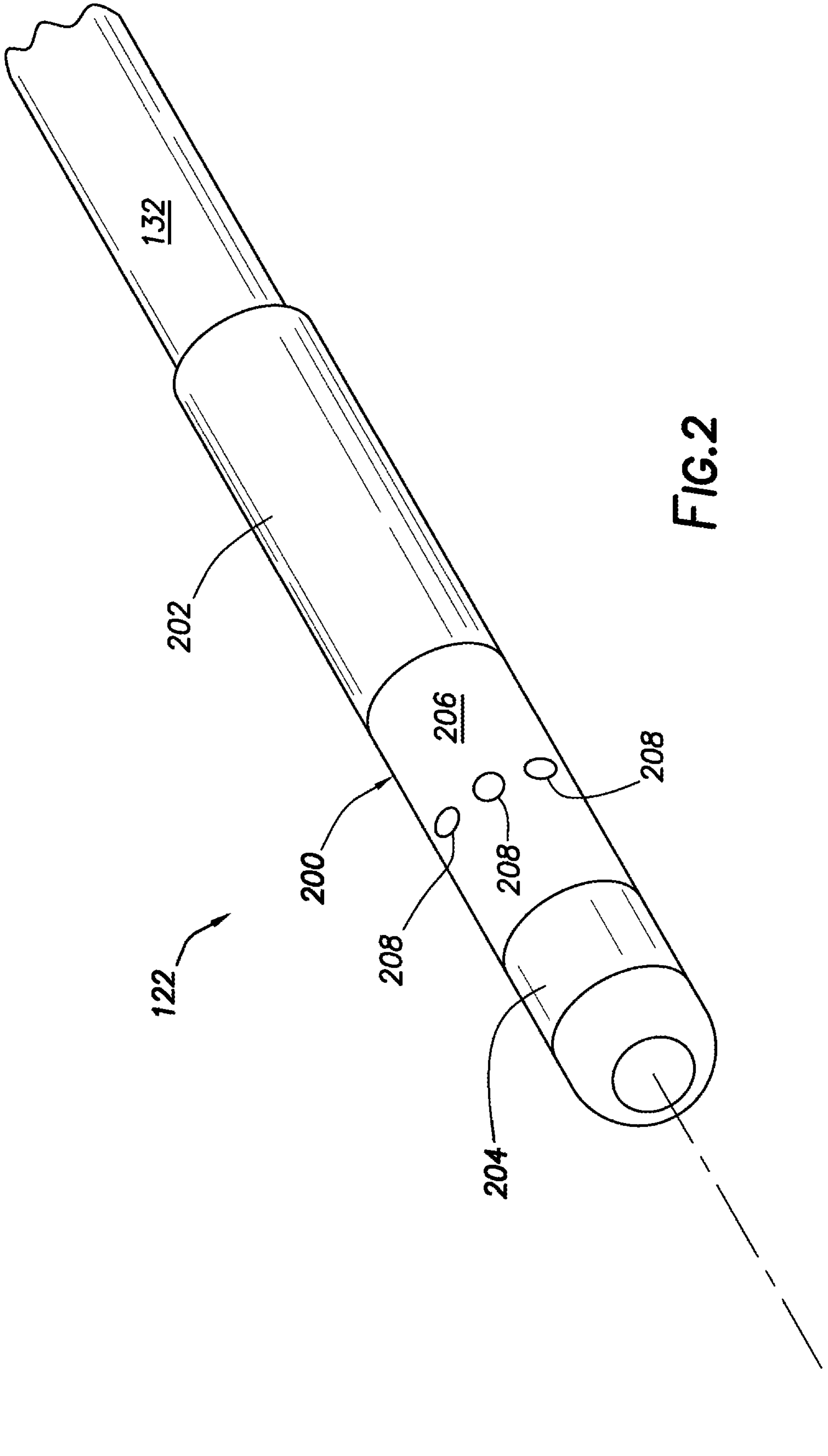
FIG. 2 shows a perspective view of a cleanout tool in accordance with at least some embodiments.

FIG. 2 shows a perspective view of a cleanout tool in accordance with at least some embodiments. In particular, example cleanout tool 122 of FIG. 2 comprises a tool body 200 coupled to a joiner 202 on one end, and the tool body coupled directly to a bull nose 204 opposite the joiner 202. The joiner 202 is shown coupled to tubing 132 as discussed above. The portion of the tool body 200 visible in FIG. 2 is a medial portion 206, and as shown medial portion 206 is cylindrical. The tool body 200 further comprises a plurality of ports 208 medially disposed on the medial portion 206. As will be discussed in greater detail below, the ports 208 fluidly couple to an internal annular channel within which resides a ball. The ball moving within the annular channel causes the fluid streams exiting the ports 208 to pulsate. The pulsation may take two different forms. The ball moving around the annular channel blocks the flow through each port sequentially. Thus, the first aspect of the pulsation is an on/off pulsation of the fluid stream through each port. Moreover, when the ball blocks an internal aperture of each port 208, the flow rate of the fluid streams from the remaining unblocked ports 208 increases. Thus, a second aspect of the pulsation is a sequential increase and decrease in pressure (and thus flow) of the fluid stream exiting each port 208.

Figure 3:
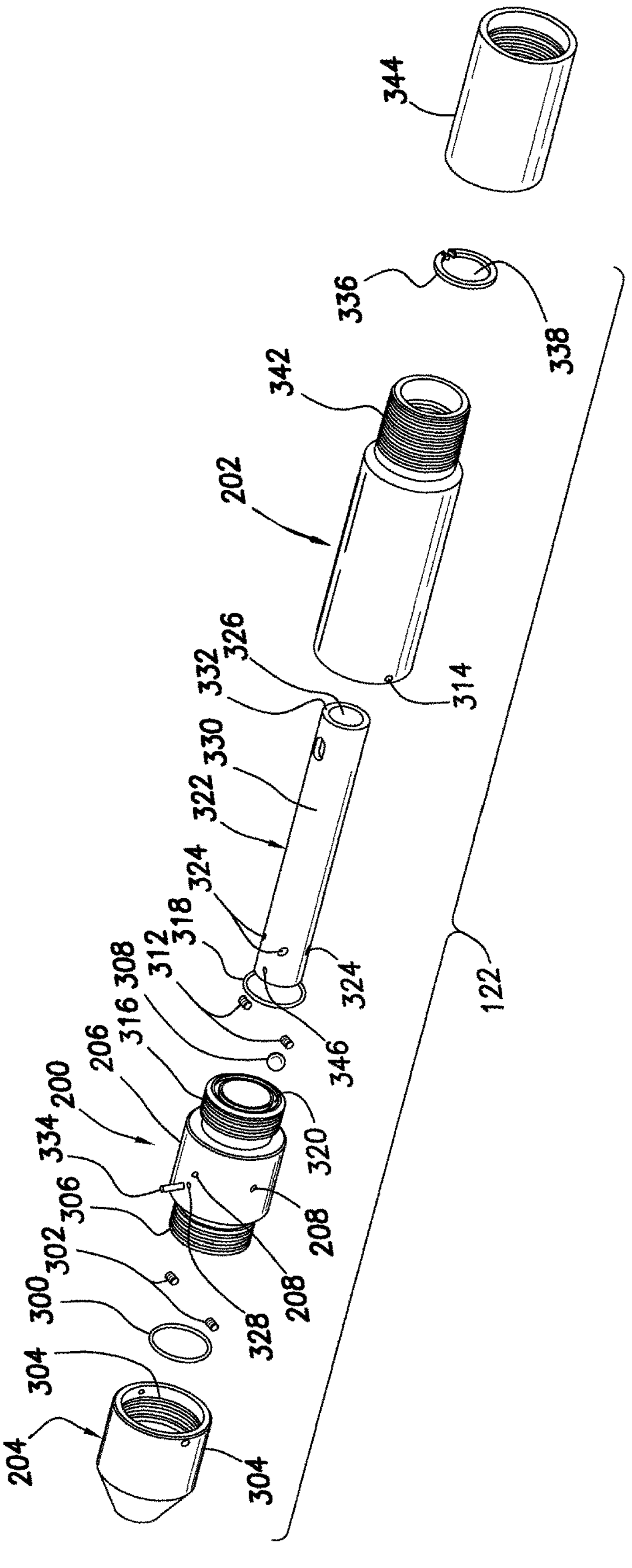
FIG. 3 shows an exploded perspective view of an example cleanout tool in accordance with at least some embodiments.

FIG. 3 shows an exploded perspective view of an example cleanout tool in accordance with at least some embodiments. In particular, FIG. 3 shows that example cleanout tool 122 comprises the bull nose 204, the tool body 200, and the joiner 202. Further visible in FIG. 3 are various internal components. The description starts with bull nose 204 and conceptually works to the right. In particular, between the bull nose 204 and the tool body 200 resides O-ring 300. In particular, O-ring 300 resides in an annular groove on the tool body 200 (the groove not visible in FIG. 3), and when assembled the O-ring 300 seals against a sealing surface within the bull nose 204. Set screws 302 couple through threaded apertures 304 on the bull nose 204 and lock the bull nose 204 to the first end 306 of the tool body 200.

Next is the example tool body 200. The tool body 200 has a first end 306 and a second end 316 opposite the first end 306. The tool body 200 defines a medial portion 206 disposed between the first end 306 and second end 316. The medial portion 206 is cylindrical and has a medial outside diameter (not specifically labeled in FIG. 3). Several of the ports 208 are visible in the medial portion 206. The first end 306 and second end 316 each have a set of external threads, and the pitch diameter of the threads is smaller than the outside diameter of the medial portion 206 (the pitch diameter not specifically labeled in FIG. 3).

A through bore 328 is defined through the medial portion 206 of the tool body 200. When assembled, a pin 334 telescopes through the through bore 328 and into operational relationship with a counter bore or through bore on the sleeve 322 (discussed more below). The pin 334 locks the sleeve 322 against rotation. In some cases, the pin 334 is a press-fit with the through bore to hold the pin in place, and removal may involve pressing the pin 334 into the internal diameter of the tool body 200. In other cases, through bore 328 may be fully or partially threaded, and pin 334 may have external threads (not specifically shown), such that the pin 334 is locked in place by the mating the threads of the pin 334 with threads of the through bore 328.

Ball 308 is shown, and as discussed in greater detail below ball 308 is disposed within an annular channel within the tool body 200 (the annular channel not visible in FIG. 3). Set screws 312 couple through threaded apertures 314 on the joiner 202 (only one threaded aperture 314 visible in FIG. 3), lock the joiner 202 to the second end 316 of the tool body 200 after the joiner 202 is coupled to the tool body 200 by way of respective threads (discussed more below). In example systems O-ring 318 resides in annular groove 320 on the tool body 200, and when assembled the O-ring 318 seals against sealing surface within the joiner 202 (the sealing surface not visible in FIG. 3).

Still referring to FIG. 3, the example cleanout tool 122 further comprises a sleeve 322. The sleeve 322 telescopes within the inside diameters of the joiner 202 and tool body 200. The sleeve 322 comprises a bore 346, which may be a through bore or a counter bore. The bore 346 works in conjunction with the pin 334 to rotationally lock the sleeve in relation to the tool body 200. The sleeve 322 further comprises a plurality of ducts 324 (only three ducts visible in FIG. 3). The ducts 324 extend through the sleeve 322, and as is shown in more detail below the ducts 324 fluidly couple the inside diameter 326 of the sleeve 322 to the annular channel within which the ball 308 resides.

The example cleanout tool 122 further comprises locking ring 336 in the example form of an internal spring or C-clip. When the cleanout tool 122 is assembled, locking ring 336 fits within an internal annular groove of the joiner 202 (the internal annular groove not visible in FIG. 3). When in place, the locking ring 336 abuts the end face 332 of the sleeve 322. The locking ring 336 defines through bore 338. In other example systems, the locking ring 336 may be implemented as an externally threaded nut that telescopes with the joiner 202 and couples to internal threads on an inside surface of the joiner 202. As rotation of the sleeve 322 is prevented by the pin 334 extending through the through bore 328 into the bore 346, any suitable device that holds the sleeve in a fixed axial location relatively to the joiner 202 and tool body 200 may be used. In some cases, tubing 132 (not shown in FIG. 3) may couple to the joiner 202 by way of tapered threads 342. In other cases, additional stages (discussed more below) of the cleanout tool may couple to the joiner 202 by way of coupling 344.

Figure 4:
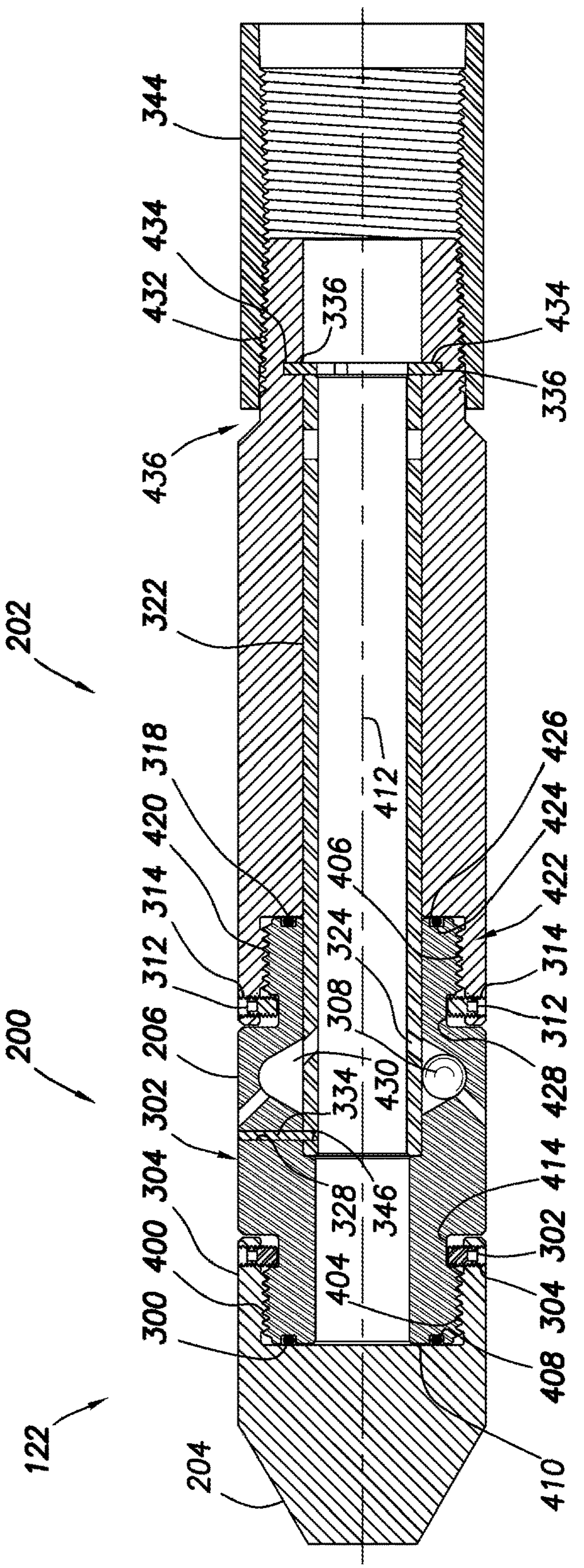
FIG. 4 shows a cross-sectional elevation view of an assembled cleanout tool in accordance with at least some embodiments.

FIG. 4 shows a cross-sectional elevation view of an assembled cleanout tool in accordance with at least some embodiments. In particular, FIG. 4 show bull nose 204 coupled directly to the tool body 200. In the example system, the bull nose 204 has a set of internal pipe threads 400. Tool body 200 has a set of external pipe threads 404, and in the example system the bull nose 204 couples to the tool body 200 by the respective pipe threads 400/404. O-ring 300 is disposed within an annular groove 408 on the end face 410 of the tool body 200, where the annular groove 408 circumscribes the central longitudinal axis 412 of the tool body 200. In alternate embodiments, the annular groove for O-ring 300 may be defined in the bull nose 204. Set screws 302 are threaded through threaded apertures 304, the set screws 302 contacting and locking against an annular groove 414 defined on an outside surface of the tool body 200. The annular groove 414 circumscribes the central longitudinal axis 412, and annular groove 414 resides between the external pipe threads 404 and medial portion 206 of the tool body 200.

FIG. 4 further shows joiner 202 coupled directly to the tool body 200. In the example system, the second end of the tool body 200 has external pipe threads 406. Joiner 202 has a set of internal pipe threads 420, and in the example system joiner 202 couples directly to the tool body 200 by the respective threads 406/420. O-ring 318 is disposed within an annular groove 424 on the end face 426 of the tool body 200, where the annular groove circumscribes the central longitudinal axis 412 of the tool body 200. In alternate embodiments, the annular groove for O-ring 318 may be defined in the joiner 202. Set screws 312 are threaded through threaded apertures 314, the set screws 312 contacting and locking against an annular groove 428 defined on an outside surface of the tool body 200. The annular groove 428 circumscribes the central longitudinal axis 412, and annular groove 428 resides between the external pipe threads 406 and medial portion 206 of the tool body 200.

Defined with the tool body 200 is an annular channel 430, the annular channel 430 circumscribes the central longitudinal axis 412. The annular channel 430 is open to a counter bore within the tool body 200 (the counter bore discussed more below). The example annular channel 430 has a closed bottom, and in some cases the closed bottom has a semi-circular cross-section. In some cases a single ball 308 is disposed within the annular channel 430. In example embodiments, the ball 308 has a diameter of about two thousandths (0.002) of an inch less than the difference between the inside diameter of the annular channel and the second inside diameter of the tool body.

Sleeve 322 telescopes within the joiner 202 and tool body 200. On one end sleeve 322 abuts an annular shoulder defined within tool body 200 (the annular shoulder discussed more below). The sleeve 322 partially occludes annular channel 430. Sleeve 322 has a plurality of ducts 324. Each duct 324 fluidly couples the internal flow path of the cleanout tool 122 to the annular channel 430. In example embodiments, the ball 308 is configured to move within the annular channel 430 circularly around the central longitudinal axis 412, and the ball 308 is constrained against movement axially (relative to the central longitudinal axis 412) by the annular channel 430 and sleeve 322. Also shown in FIG. 4 is the through bore 328 having pin 334 telescoped therein. The distal end of pin 334 telescopes into bore 346, which locks the sleeve 322 against rotational movement relative to the tool body 200. In practice, the through bore 328 and bore extending from the annular channel 430 to the outside diameter (not specifically numbered, but discussed more below with respect to FIG. 6) would not both be at the same radial location (i.e., a cross-section would not necessarily show both as in FIG. 4), but the through bore 328 and pin 334 are added in FIG. 4 for purposes of disclosure.

Still referring to FIG. 4, on the second end 436 of the joiner 202 (opposite the tool body 200), joiner 202 has a set of external tapered threads 432. The external tapered threads 432 on the second end 436 of the joiner 202 may be used to couple to tubing 132 (not shown), or may be used to couple to a coupling 344 as shown. The joiner 202 defines an internal annular groove 434 that circumscribes the central longitudinal axis 412. The internal annular groove 434 is used in conjunction with the locking ring 336. In particular, locking ring 336 defines an outside diameter slightly smaller than the inside diameter at the deepest point of the internal annular groove 434. Locking ring 336 is compressed for installation, and when the compression is released the locking ring 336 expands into the internal annular groove 434. Moreover, when in place within the internal annular groove 434 the locking ring 336 abuts the end face 332 of the sleeve 322, thus holding the sleeve in place against the annular shoulder within the tool body 200 (the annular shoulder discussed more below).

Figure 5:
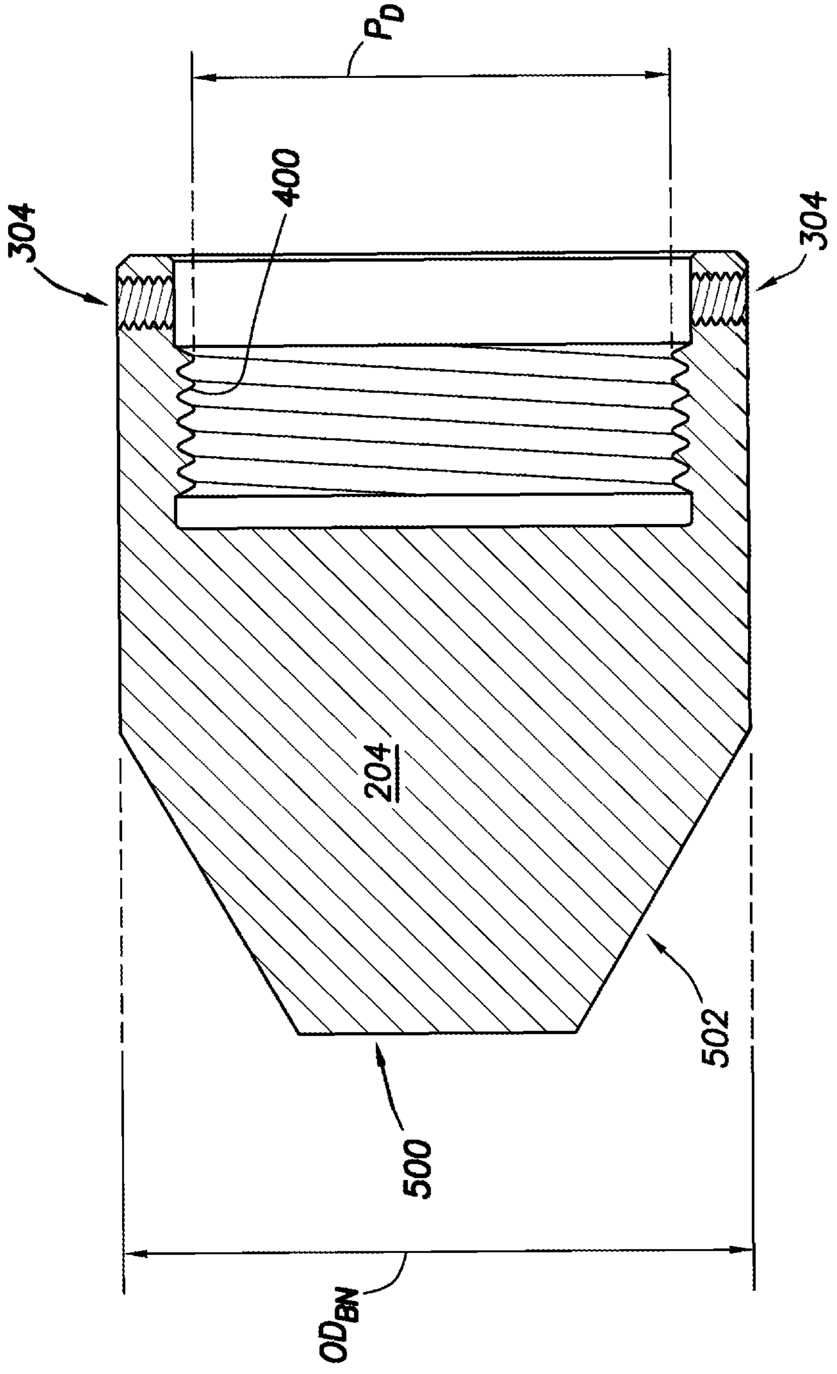
FIG. 5 shows a cross-sectional view of a bull nose in accordance with at least some embodiments.

FIG. 5 shows a cross-sectional view of a bull nose in accordance with example embodiments. In particular, example bull nose 204 comprises a flat distal end 500 and a conic frustum section 502 that expands out to the outside diameter ODBN. In example systems, outside diameter ODBN of the bull nose is equal to the outside diameter of the medial portion 206 of the tool body 200 (FIG. 4). Opposite the conic frustum 502 the bull nose 204 defines a proximal end within which the internal pipe threads 400 reside. The pitch diameter PD of the internal pipe threads correspond to the pitch diameter of the external pipe threads 404 of the tool body 200 (FIG. 4, and discussed more below). Also visible in FIG. 5 are the example threaded apertures 304 into which the set screws 302 (FIG. 3) may be threaded during assembly of the cleanout tool 122. The example bull nose 204 is made of metallic material not only to withstand physical contact on the exterior surfaces (e.g., being placed in the casing 114, or hitting the bottom of the borehole 116), but also withstand the pressure differential across the cleanout tool 122 when in use. Other shapes for the bull nose are possible, such as semicircular, or just flat.

Figure 6:
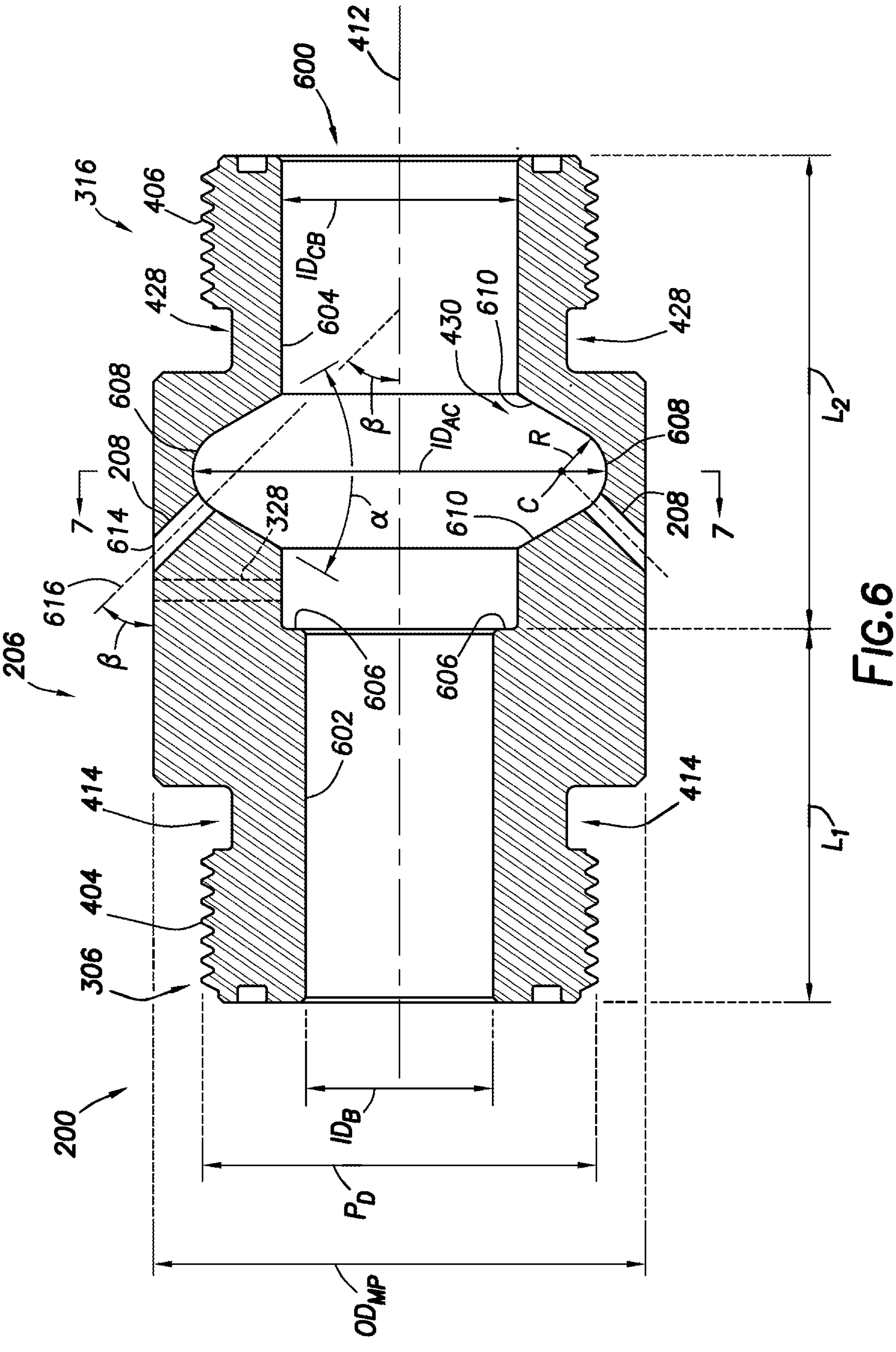
FIG. 6 shows a cross-sectional view of a tool body in accordance with at least some embodiments.

FIG. 6 shows a cross-sectional view of a tool body in accordance with at least some embodiments. In particular, the tool body 200 comprises first end 306 and second end 316 opposite the first end 306. The tool body 200 further defines a medial portion 206, and in example embodiments the medial portion 206 is cylindrical and defines the central longitudinal axis 412. Moreover, the medial portion 206 defines an outside diameter $OD_{MP}$. For an example cleanout tool for use in a casing with a five inch internal diameter, the outside diameter $OD_{MP}$ may be about 3.125 inches. However, larger and smaller cleanout tools may be used within larger and smaller casing sizes as appropriate. The tool body 200 comprises external pipe threads 404 on the first end 306. The external pipe threads 404 define a pitch diameter PD smaller than the outside diameter $OD_{MP}$ of the medial portion 206. The cross-sectional view of FIG. 6 also shows the annular groove 414. The example annular groove 414 has an outside diameter (not specifically referenced so as not to unduly complicate the figure) smaller than both the pitch diameter PD of the external pipe threads 404 and smaller than the outside diameter $OD_{MP}$ of the medial portion 206. As mentioned previously, the set screws 302 seat against the outside diameter of the annular groove 414 to help hold the bull nose 204 in place.

The tool body 200 further comprises external pipe threads 406 on the second end 316. In the example system the external pipe threads 406 define a pitch diameter PD the same as the pitch diameter PD of the external pipe threads 404 on the first end 306. Thus, the pitch diameter of the external pipe threads 406 is smaller than the outside diameter $OD_{MP}$ of the medial portion 206. The cross-sectional view of FIG. 6 also shows the annular groove 428. The example annular groove 428 has an outside diameter (not specifically referenced so as not to unduly complicate the figure) smaller than both the pitch diameter of the external pipe threads 404/406 and smaller than the outside diameter $OD_{MP}$ of the medial portion 206. As mentioned previously, the set screws 312 (FIG. 3) seat against the outside diameter of the annular groove 428 to help hold the joiner 202 in place.

Still referring to FIG. 6, the example tool body 200 further comprises an internal flow channel 600. The internal flow channel 600 comprises a first bore 602 within the tool body 200, and a counter bore 604 within the tool body 200. The first bore 602 has a central axis coaxial with the central longitudinal axis 412, and the first bore 602 defines an inside diameter $ID_B$ along a first axial length $L_1$ that extends from the first end 306 toward the middle of the internal flow channel 600. Counter bore 604 defines a central axis coaxial with the central longitudinal axis 412. The counter bore 604 defines an inside diameter $ID_{CB}$ along a second axial length L2 that extends from the second end 316 toward the middle of the internal flow channel 600. The inside diameter $ID_{CB}$ of the counter bore 604 is greater than the inside diameter $ID_B$ of the first bore 602. An annular shoulder 606 is created at the intersection of the first bore 602 and the counter bore 604. Though shown in cross section in FIG. 6, the annular shoulder 606 defines and resides within a plane (in the view of FIG. 6, the plane is perpendicular to the page), and the plane is perpendicular to the central longitudinal axis 412.

FIG. 6 further shows annular channel 430 defined within the tool body 200. The annular channel 430 circumscribes the counter bore 604, and the annular channel 430 is open at the inside diameter $ID_{CB}$ of the counter bore 604. The annular channel 430 has a closed bottom 608. The annular channel 430 defines an inside diameter $ID_{AC}$ greater than the inside diameter of the counter bore $ID_{CB}$. Though the "bottom" of the channel at the inside diameter $ID_{AC}$ can take many forms, in the example system the closed bottom 608 has a semi-circular cross-section with a radius of curvature R having a center C, where the center C resides within the annular channel 430. The annular channel 430 further defines side walls 610 that intersect the inside diameter $ID_{CB}$ of the counter bore 604 and form an angle $\alpha$. In an example cleanout tool, the angle $\alpha$ is about 60 angular degrees, but larger and smaller angles are also contemplated.

The example tool body 200 further comprises ports 208 through the tool body 200. FIG. 6 shows two ports 208 in cross section for purposes of explanation; however, an example cleanout tool 122 has five ports and thus only one port may be visible in any particular cross section. Referring to the upper port 208 as representative of all the ports 208, each port has an inside aperture 612 within the annular channel 430, and an outside aperture 614 through the outside diameter of the medial portion 206. In some example systems the inside aperture 612 resides within the portion of annular channel 430 defined by the radius of curvature R such that the ball 308 (not shown in FIG. 6) can better block the flow through each port; however, the inside apertures can also reside in part or in whole on the straight portions of the side walls 610. Each port defines a flow channel axis 616 that forms an angle β with the outside diameter of the medial portion 206. Another way to consider the angle is that the flow channel axis 616 forms an angle β with central longitudinal axis 412 (if the flow channel axis 616 intersects or is projected onto the central longitudinal axis 412). Stated in other terms, in use of the cleanout tool 122 fluid streams move from the annular channel 430, through the ports 208, exit the ports 208, and intersect an inside diameter of the casing at axial depths within the casing different than the axial depths where the fluid streams exit the cleanout tool 122. In example systems, the angle β about 45 angular degrees (whether measured to the outside diameter of the medial portion 206 or measured to the central longitudinal axis 412). The location of the outside aperture 614 will be different for different values of the angle β while the location of the inside aperture remains unchanged.

FIG. 6 also shows (in dashed lines) the through bore 328. The through bore 328 is shown in dashed lines because both the through bore 328 and port 208 would not reside at the same radial location, and thus both would not be visible in a cross-section as in FIG. 6. Nevertheless, the example through bore 328 extends through the tool body 200 between the outside diameter of the medial portion 206 and the larger diameter of the internal flow channel 600 such that the pin 334 (not shown in FIG. 6) may interact with the sleeve 22 (not shown) that abuts the shoulder 606.

Figure 7:
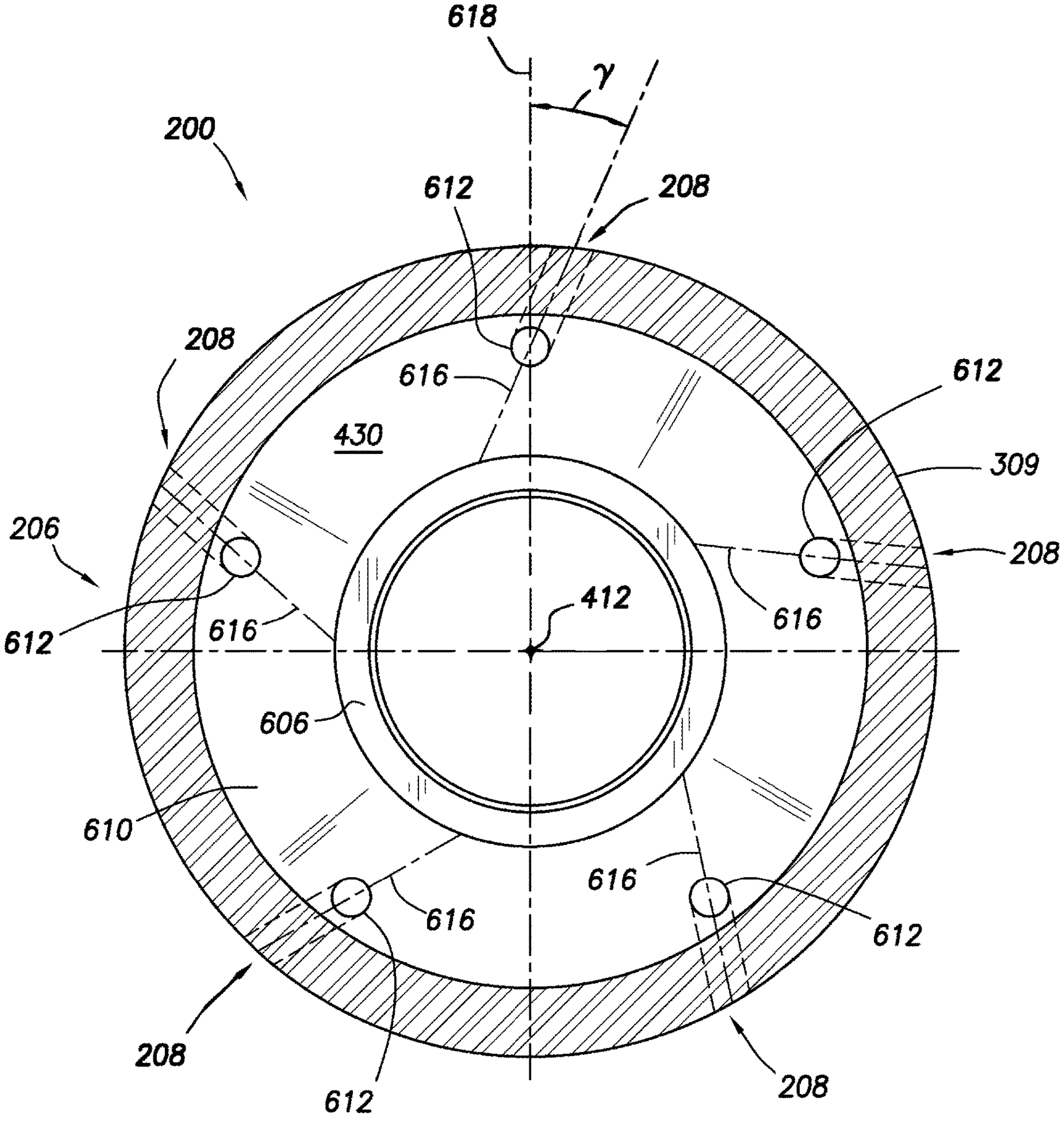
FIG. 7 shows a cross-sectional view of the tool body (taken along line 7-7 of FIG. 6) in accordance with at least some embodiments.

FIG. 7 shows a cross-section view of a tool body (taken along line 7-7 of FIG. 6) in accordance with at least some embodiments. In particular, visible in FIG. 7 is the medial portion 206 and its outside diameter. Within the tool body 200 resides the annular channel 430, and also visible is the annular shoulder 606. On the side walls 610 of the annular channel 430 are the inside apertures 612 of each port 208. As shown in FIG. 7, at least some example cleanout tools 122 have exactly five ports 208 evenly spaced around the annular channel 430. As before, each port 208 defines a flow channel axis 616 that is the long central axis of each port 208. FIG. 7 further shows that each flow channel axis 616 forms an angle γ (only one flow channel axis marked so as not to further complicate the figure) between the flow channel axis 616 and a radial line 618 from the central longitudinal axis 412 (in the view of FIG. 7, the central longitudinal axis 412 is a point) that intersects the flow channel axis 616 at the inside aperture 612. In some example systems, angle γ is about 30 angular degrees. Stated in terms of fluid dynamic forces, in use of the cleanout tool 122 fluid streams move from the annular channel 430, through the ports 208, and exit the ports 208 in such a way as to apply a rotational force to the cleanout tool 122. The example tool body 200 is installed such that the rotational force tends to tighten the various pipe and tapered threaded connections between the components (e.g., between the tool body 122 and the joiner 202). And as discussed more below, in some example methods of use the cleanout tool 122 is held at a constant rotational orientation regardless of the rotational force created.

Figure 8:
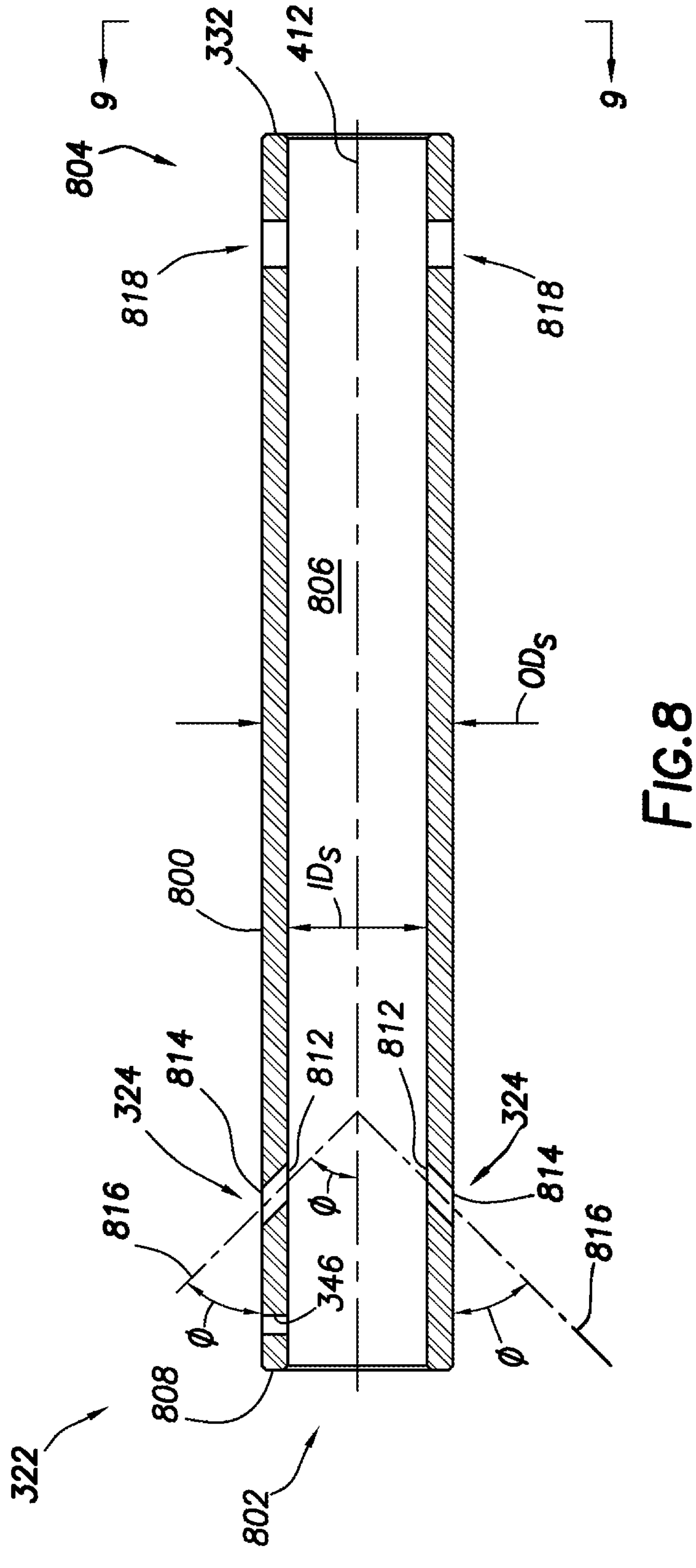
FIG. 8 shows a cross-sectional view of a sleeve in accordance with at least some embodiments.

FIG. 8 shows a cross-sectional view of the sleeve in accordance with at least some embodiments. In particular, sleeve 322 comprises an outside surface 800 that is cylindrical and has an outside diameter ODs. The outside diameter ODs is selected such that the sleeve 322 can telescope within and abut the inside diameter of the joiner 202, and can telescope within and abut the counter bore 604 of the tool body 200, but not necessarily a press-fit connection between the components. The sleeve 322 defines a through bore 806 that extends through the sleeve 322. The through bore 806 has an inside diameter IDs and a central axis coaxial with the central longitudinal axis 412. The sleeve 322 defines a first end 802, and the second end 804 opposite the first end 802. The sleeve 322 further defines end face 808 on the first end 802. The end face 808 defines and resides within a plane (in the view of FIG. 8 the plane would be perpendicular to the page), and the plane is perpendicular to the central longitudinal axis 412. When assembled into the cleanout tool 122, the end face 808 abuts the annular shoulder 606 (FIG. 6). The sleeve 322 also has an end face 332 on the second end 804 of the sleeve 322. The end face 332 defines and resides within a plane (in the view of FIG. 8 the plane would be perpendicular to the page), and the plane is also perpendicular to the central longitudinal axis 412. When assembled into the cleanout tool 122, the end face 332 abuts the locking ring 336 (FIG. 3).

Sleeve 322 further comprises a plurality of ducts 324 through the body of the sleeve 322. FIG. 8 shows two ducts 324 in cross section for purposes of explanation; however, an example cleanout tool 122 has five ports through the tool body 200, and the example sleeve 322 may likewise have five ducts 324 evenly spaced around the sleeve 322. Thus, only one duct may be visible in any particular cross section. Nevertheless, referring to the upper port duct 324 as representative of all the ducts 324, each duct 324 has an inside aperture 812 on the inside diameter IDs of the through bore 806, and an outside aperture 814 on the outside diameter ODs of the outside surface 800. Each duct defines a duct axis 816 that forms an angle Ø with the outside surface 800 of the sleeve 322. Another way to consider the angle is that the duct axis 816 forms an angle Ø with central longitudinal axis 412 (if the duct axis 816 intersects or is projected onto the central longitudinal axis 412). When the sleeve 322 is assembled into the joiner 202 and tool body 200, the ports 208 are in operational relationship with the annular channel 430, and thus fluids in the through bore 806 may pass into the annular channel 430 to move the ball 308 as well as to be ejected through the ports 208 in the tool body.

Still referring to FIG. 8, and referring again to the second end 804 of the sleeve 322, the second end 316 further comprises a set of puller holes 818. As the name implies, the puller holes 818 may be used to help telescope the sleeve into the joiner 202 and tool body 200, and likewise may be used to help telescope the sleeve 322 out of the joiner 202 and tool body 200.

Figure 9:
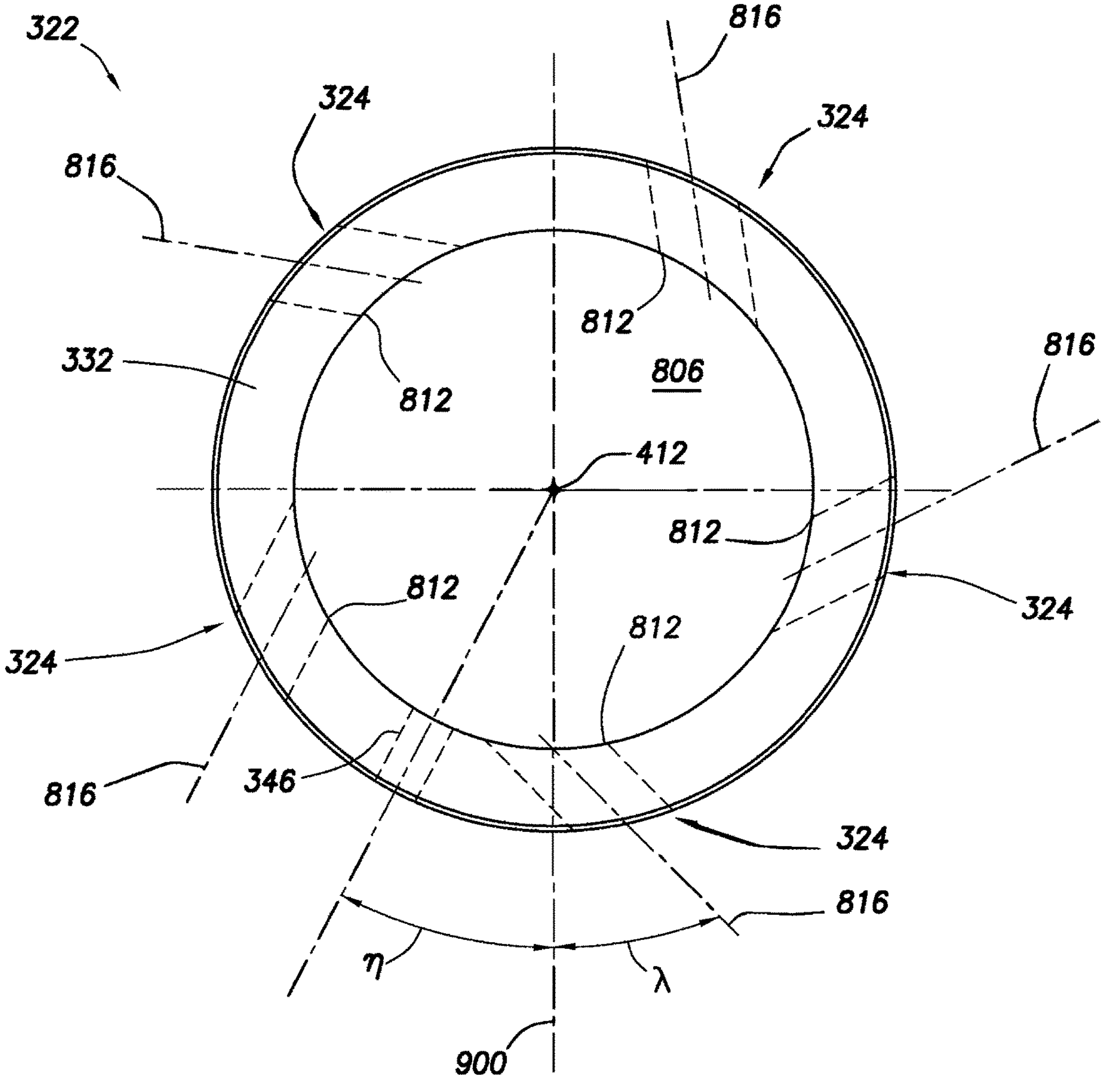
FIG. 9 shows an end elevation view (taken along line 9-9 of FIG. 8) of the sleeve in accordance with at least some embodiments.

FIG. 9 shows an end elevation view (taken along line 9-9 of FIG. 8) of the sleeve in accordance with at least some embodiments. In particular, the view of FIG. 9 shows the relative location of the ducts 324 (in dashed lines) in example systems with five ducts 324. Within the sleeve 322 resides the through bore 806. On the inside diameter of the sleeve 322 are the inside apertures 812 of each duct 324. As shown in FIG. 9, at least some example cleanout tools 122 have exactly five ducts 324 evenly spaced around the sleeve 322 (and when assembled, the ducts in operational relationship to the annular channel 430 (FIG. 4)). As before, each duct 324 defines a duct axis 816 that is the long central axis of each duct 324. FIG. 9 further shows that each duct axis 816 forms an angle λ (only one duct axis marked so as not to further complicate the figure) between the duct axis 816 and a radial line 900 from the central longitudinal axis 412 (in the view of FIG. 9, the central longitudinal axis 412 is a point) that intersects the duct axis 816 at the inside aperture 812. In some example systems, angle λ is about 45 angular degrees.

The example sleeve 322 further comprises the bore 346 (dashed lines), illustratively shown as a through bore. As previously mentioned, the bore 346 of the sleeve 322 aligns with the through bore 328 (FIG. 3), and pin 334 (FIG. 3) telescoped through the through bore 328 into relationship with bore 346 to prevent rotation of the sleeve 322 relative to the tool body 200. FIG. 9 also shows one example alignment of radial location of the bore 346. In particular, considering that the example five ducts 324 are evenly spaced around the sleeve 322, the central axis of the bore 346 may reside at an angle η relative to the radial line 900 that intersects the duct axis 816 at the inside aperture 812 of the nearest neighbor duct 324. In some example systems, angle η is about 28 angular degrees.

Figure 10:
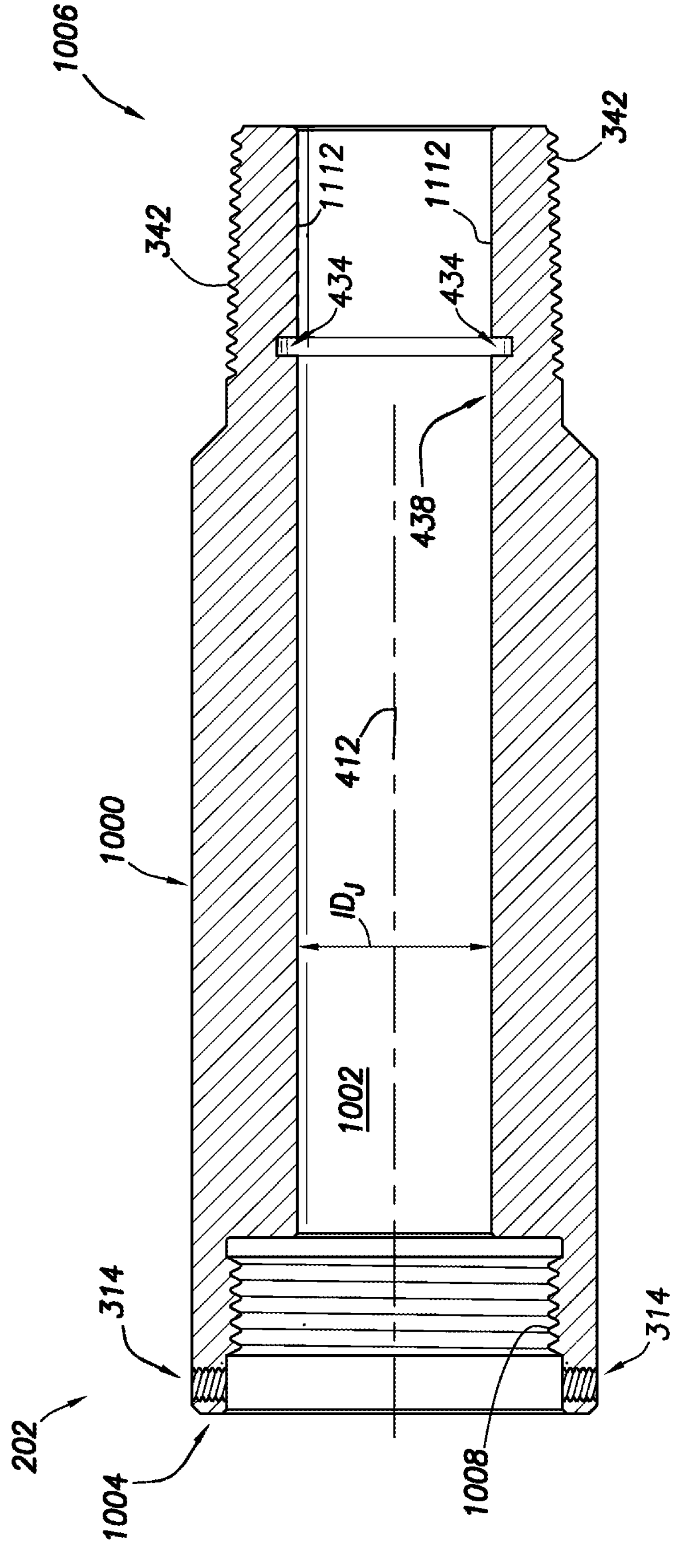
FIG. 10 shows a cross-sectional elevation view of a joiner in accordance with at least some embodiments.

FIG. 10 shows a cross-sectional elevation view of the joiner in accordance with at least some embodiments. In particular, the example joiner 202 comprises an outside surface 1000 that is cylindrical and has a central axis coaxial with the central longitudinal axis 412. Other outside surface 1000 shapes are contemplated. The joiner 202 further includes through bore 1002 that defines an inside diameter $ID_J$ equal to the inside diameter $ID_{CB}$ (FIG. 6) of the counter bore 604 of the tool body 200. The joiner 202 defines a first end 1004 and a second end 1006 opposite the first end 1004. The first end 1004 includes internal pipe threads 1008 on an inside surface of the through bore 1002 of the joiner 202. When assembled into example cleanout tool 122, the internal pipe threads 1008 couple to the external pipe threads 406 on the second end of the tool body 200 (FIG. 6). The second end 1006 comprises external tapered threads 342 on the outside surface opposite the first end 1004 of the joiner 202. Moreover, the example joiner 202 defines inside diameter 1012 on an inside surface of the through bore 1002 on the second end 1006 of the joiner 202. Also visible are the threaded apertures 314 on the first end 1004. The specification now turns to operational characteristics of the cleanout tool 122.

FIG. 11 shows both a simplified overhead (cross-sectional) view at a particular elevation of a cleanout tool in operation (upper portion), a simplified side elevation view of a cleanout tool in operation (middle portion), and example swath size (lower portion), in accordance with at least some embodiments. In particular, visible in the upper portion and lower portion are the same example cleanout tool 1100 producing a fluid stream 1102 impacting an inside diameter of a casing 1104 backed by cement 1106. As shown by the upper and middle portions, the fluid stream 1102 exits along a radial line from an example central longitudinal axis 1108. Thus, there is no downward (or upward) component to the fluid stream 1102 as the fluid stream exists the port (not specifically numbered). The lower portion shows a swath area 1110 the fluid stream 1102 creates on the inside surface of the casing 1104. As shown, the swath area 1110 is circular and has a diameter Ds, and likely the swath diameter Ds is slightly larger than a diameter (not specifically referenced) of the fluid stream 1102 exiting the example cleanout tool 1100.

FIG. 12 shows both a simplified overhead (cross-sectional) view at a particular elevation of a cleanout tool in operation (upper portion), a simplified side elevation view of a cleanout tool in operation (middle portion), and example swath size (lower portion), in accordance with at least some embodiments. In particular, visible in the upper portion and lower portion are the cleanout tool 122 producing a fluid stream 1202 impacting an inside diameter of a casing 114 backed by cement 118. As shown by the upper portion, the fluid stream 1202 exits along a flow channel axis that forms an angle γ as defined above. As shown by the middle portion, the fluid stream 1202 exits along an example downward flow channel axis that forms an angle β as defined above. The lower portion shows a swath area 1210 the fluid stream 1202 creates on the inside surface of the casing 114. Superimposed within the swath area 1210 is the example swath area 1110 for the situation shown in FIG. 11. Changing the angles that the fluid streams 1202 exist in the cleanout tool 122 consistent with the teachings of this specification increases the swath area 1210 for corresponding characteristics of the fluid streams 1102/1202. The inventors of the current specification have found the increased swath area or swath size results in better cleaning of the casing for equivalent fluid usage. While the inventors do not wish to be tied to any particularly physical explanation, one possible physical explanation is that the angles that the fluid streams encounter the casing may help force the fluid streams behind the scale, thus promoting a peeling away of the scale. The angles may also create a tornadic motion of the fluid in the annulus between the outside diameter of the tool and inside diameter of the casing, combined with the pulsing created by the ball within the tool periodically blocking or reducing flow from each port. Further, the angles that the fluid streams encounter the casing may also have certain advantages when those fluid streams intersect perforations 120 (FIG. 1). Again, while the inventors do not wish to be tied to any particularly physical explanation, one possible physical explanation in relation to perforations may be the angles create better swirling action of fluid in the perforations 120, the swirling action tending to entrain scale and fines in the swirling fluid in the perforations, which scale and fines are then more likely to flow into the casing (rather than being pushed further into the perforations from a “direct hit” by the flow channel axis of a port aligning with a flow channel axis of a perforation).

Figure 13:
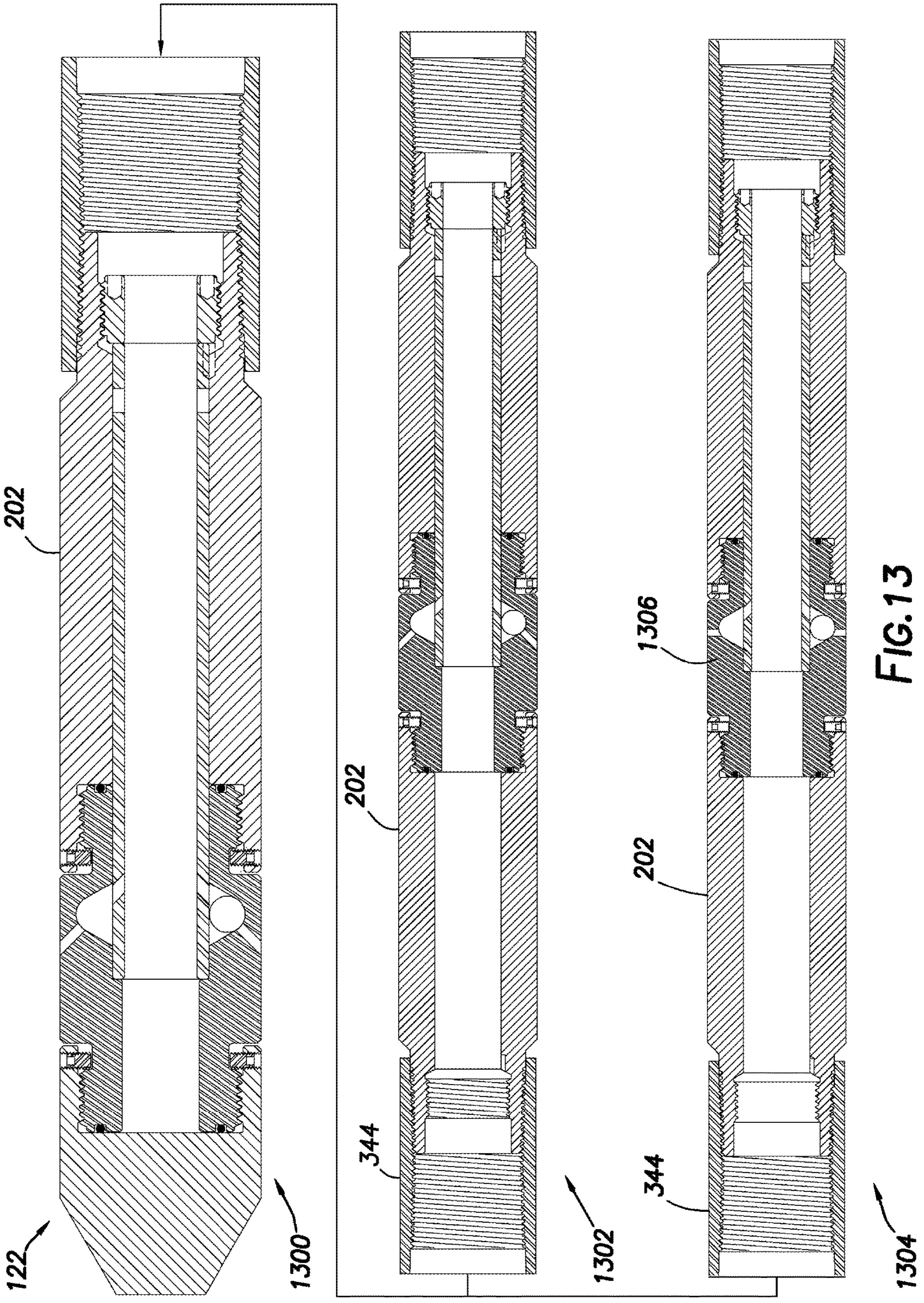
FIG. 13 shows a stackable cleanout tool system in accordance with at least some embodiments.

The various embodiments of the cleanout tool discussed to this point have assumed the tool body 200 is directly coupled to the bull nose 204, and thus no pass through of the fluid within the tool. However, example components discussed to this point can be stacked to create cleanout tools with multiple ports and thus multiple tool bodies. FIG. 13 shows a stackable cleanout tool system in accordance with at least some embodiments. In particular, the upper drawing 1300 shows the example cleanout tool 122 discussed to this point. The various components are not renumbered again in FIG. 13 so as not to unduly complicate the discussions. The components of the upper drawing may be combined with either or both of the components of the middle drawing 1302 or the lower drawing 1304. Thus, coupling 344 may be used to connect the joiner 202 of the upper drawing 1300 to the joiner 202 of the middle drawing 1302. Though the coupling 344 is shown on the left side of the middle drawing 1302, the coupling 344 may be used to connect the right side to the components of the upper drawing 1300 (such that the fluid streams produced form the respective tool bodies' project in opposite directions). In addition to or in place of the components of the middle drawing 1302, the components of the upper drawing 1300 may likewise be coupled to the components of the lower drawing 1304. Thus, coupling 344 of the lower drawing 1304 may be used to connect the joiner 202 of the lower drawing 1304 to the joiner 202 of the upper drawing 1300 (or the middle drawing 1302). Though the coupling 344 is shown on the left side of the lower drawing 1304, the coupling 344 may be used to connect the right side to the components of the upper drawing 1300. The lower drawing 1304 of FIG. 13 also shows an example tool body 1306 similarly constructed to the tool body 200, differing only in that the flow channel axis of each port is coplanar and are coaxial with radial lines extending from the central longitudinal axis (not specifically shown in FIG. 13). Thus, multiple tool bodies 200/1306 may be combined using joiners 202 and couplings 344 to create an overall cleanout tool that produces multiple fluid streams (that have multiple approach vectors to the casing).

Figure 14:
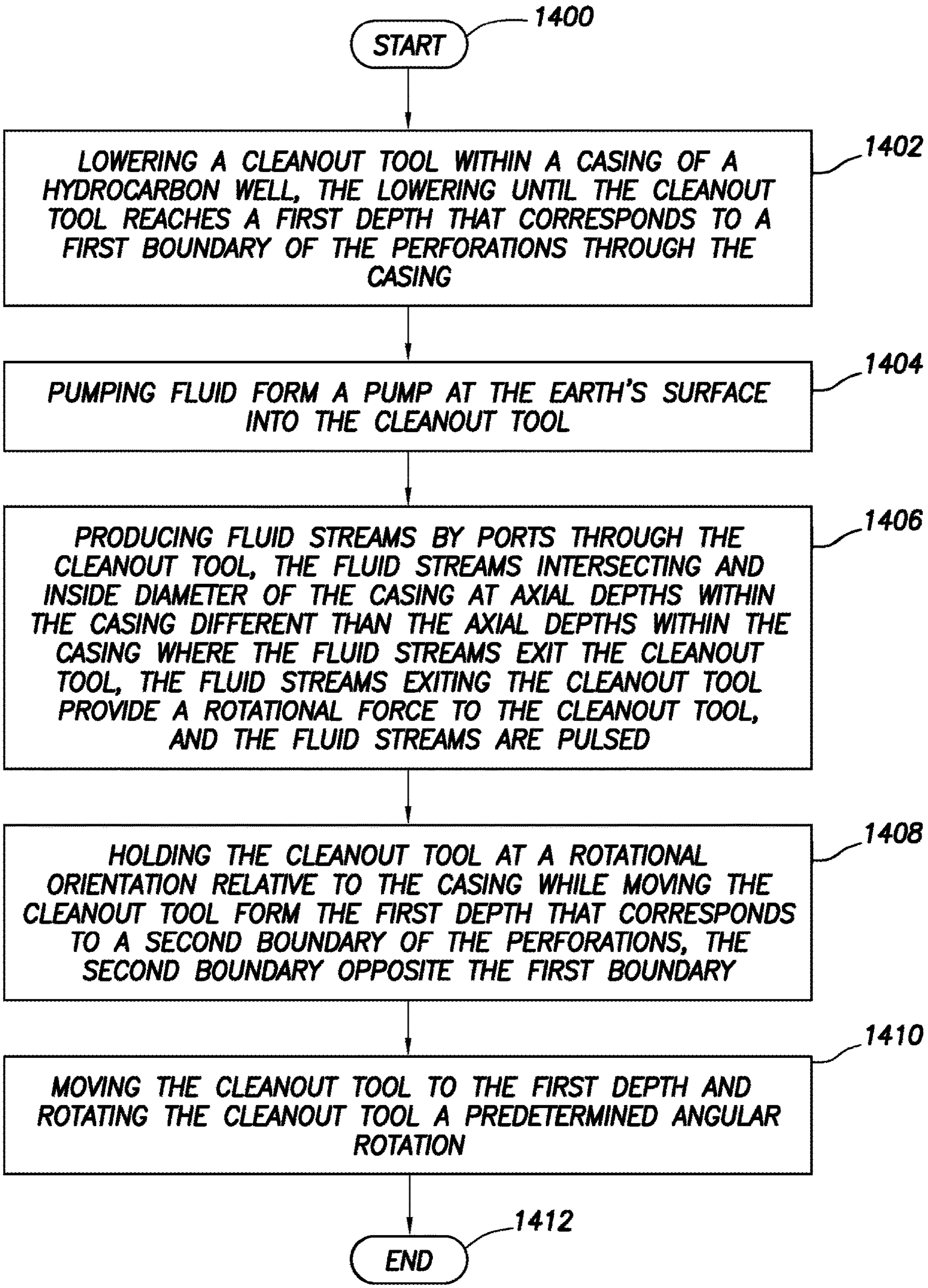
FIG. 14 shows a method in accordance with at least some embodiments.

FIG. 14 shows method in accordance with at least some embodiments. In particular, the method starts (block 1400) and may comprise: lowering a cleanout tool within a casing of a hydrocarbon well, the lowering until the cleanout tool reaches a first depth that corresponds to a first boundary of the perforations through the casing (block 1402); pumping fluid from a pump at the Earth's surface into the cleanout tool (e.g., such that pressure of the fluid in the cleanout tool is between and including 20,000 PSI and 30,000 PSI) (block 1404); producing fluid streams by ports through the cleanout tool, the fluid streams intersecting an inside diameter of the casing at axial depths within the casing different than the axial depths within the casing where the fluid streams exit the cleanout tool, the fluid streams exiting the cleanout tool provide a rotational force to the cleanout tool, and the fluid streams are pulsed (block 1406); holding the cleanout tool at a rotational orientation relative to the casing while moving the cleanout tool from the first depth to a second depth that corresponds to a second boundary of the perforations, the second boundary opposite the first boundary (block 1408); and moving the cleanout tool to the first depth and rotating the cleanout tool a predetermined angular rotation (block 1410). Thereafter the method ends block (1412), likely to be repeated at least once, and in example embodiments the method is repeated multiple times such that the cleanout tool makes a complete rotation.

In some example methods, the ports of the cleanout tool point downward (in addition to the side or γ component), and thus the bulk of the cleaning may be performed on the downward stroke. However, in other cases the ports of the cleanout tool may point upward (in addition to the side or γ component), and thus the bulk of the cleaning may be performed on the upward stroke. That is, in some cases the fluid streams are produced by the ports at axial depths within the casing above where the fluid streams intersect the inside diameter of the casing, and in other cases the fluid streams are produced by the ports at axial depths within the casing below where the fluid streams intersect the inside diameter of the casing.

The above discussion is meant to be illustrative of the principles and various embodiments of the present invention. Numerous variations and modifications will become apparent to those skilled in the art once the above disclosure is fully appreciated. For example, while the sleeve is shown as a single piece, sleeves with two or more members are contemplated. Moreover, while described in the context of a hydrocarbon wells, the cleanout tool may be used to clean out any of a variety of wellbores, such as water wells, injection wells, disposal wells, oil wells, and natural gas wells. Moreover, the cleanout tool can be used to clean out many types of structures beyond wells and wellbores, such as pipes of various sizes, pipelines, cannons, pressured gas cylinders, containers, and the like. Further still, while the example tool is described to have a bull nose on the distal end thereof, in some cases the bull nose may be replaced by a drill bit of any suitable type (e.g., roller cone, polycrystalline diamond cutter (PDC)). It is intended that the following claims be interpreted to embrace all such variations and modifications.

We claim:

1. A cleanout tool comprising:
- a first tool body comprising:
  - an outside surface and an inside surface extending along a central longitudinal axis from a first end to a second end opposite the first end;
  - an annular channel extending radially outwardly from the inside surface;
  - a plurality of ports extending through the outside surface into fluidly coupled relation with the annular channel;
- a first sleeve disposed within the first tool body in fluidly coupled relation with the annular channel;
- a first ball configured to move within the annular channel around the central longitudinal axis, under a force of fluid pumped into the cleanout tool, to cause fluid streams exiting the plurality of ports to pulsate.

2. The cleanout tool of claim 1 wherein the first sleeve partially occludes the annular channel, the first sleeve comprises a plurality of ducts fluidly coupled to the annular channel.

3. The cleanout tool of claim 1 wherein each port defines a flow channel axis, each flow channel axis is inclined relative to the central longitudinal axis.

4. The cleanout tool of claim 3 wherein each flow channel axis is inclined in oblique relation relative to the central on longitudinal axis.

5. The cleanout tool of claim 1 wherein each port defines a flow channel axis, each flow channel axis is inclined relative to a radial line from the central longitudinal axis.

6. The cleanout tool of claim 5 wherein each flow channel axis is inclined in oblique relation relative to a radial line from the central longitudinal axis.

7. The cleanout tool of claim 1 further comprising:
- a through bore in the first tool body;
- a bore in the first sleeve; and
- a pin disposed in the through bore and in the bore to prevent rotation of the first sleeve relative to the first tool body.

8. The cleanout tool of claim 1 further comprising:
- a second tool body coupled to the first tool body, the second tool body comprising:
  - an outside surface and an inside surface extending along a central longitudinal axis from a first end to a second end opposite the first end;
  - an annular channel extending radially outwardly from the inside surface;
  - a plurality of ports extending through the outside surface into fluidly coupled relation with the annular channel;
- a second sleeve disposed within the second tool body in fluidly coupled relation with the annular channel of the second body;
- a second ball disposed within the annular channel of the second tool body, the second ball configured to move circularly within the annular channel of the second tool body, and the second ball constrained against movement axially relative to the central longitudinal axis by the annular channel of the second tool body.

9. The cleanout tool of claim 1 further comprising a bull nose coupled directly to the first tool body.

10. The cleanout tool of claim 1 wherein the first ball is constrained against movement axially relative to the central longitudinal axis by the annular channel.

11. The cleanout tool of claim 1 wherein the first ball blocks the flow of the fluid through each of the plurality of ports sequentially, thereby causing the pulsating fluid streams exiting the plurality of ports to apply a rotational force to the cleanout tool.

12. The cleanout tool of claim 11 further comprising a first joiner coupled to the tool body, the first joiner having a through bore extending along a central axis coaxial with the central longitudinal axis, wherein the first sleeve is disposed within the through bore of the first joiner.

13. The cleanout tool of claim 12 further comprising a first locking ring within the through bore of the joiner and abutting a first end face of the first sleeve.

14. The cleanout tool of claim 13 wherein the first sleeve has a second end face opposite the first end face, the second end face abuts an annular shoulder of the first sleeve.

15. The cleanout tool of claim 12 wherein the first joiner has external pipe threads coupled to internal pipe threads of the tool body.

16. The cleanout tool of claim 15 wherein the rotational force applied to the cleanout tool by the pulsating fluid streams exiting the plurality of ports causes the external pipe threads and the internal pipe threads to tighten relative to one another.

* * * * *